(12) United States Patent
Kalik

(10) Patent No.: US 8,069,938 B2
(45) Date of Patent: Dec. 6, 2011

(54) ENERGY EFFICIENT ROBOTIC SYSTEM

(75) Inventor: Steven F. Kalik, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/726,442

(22) Filed: Mar. 18, 2010

(65) Prior Publication Data

US 2010/0170729 A1 Jul. 8, 2010

Related U.S. Application Data

(62) Division of application No. 11/753,715, filed on May 25, 2007, now Pat. No. 7,703,562.

(51) Int. Cl.
*B62D 51/06* (2006.01)

(52) U.S. Cl. .................................... 180/8.1; 180/65.31

(58) Field of Classification Search .................. 180/7.1, 180/8.1, 8.6, 65.31; 280/215; 290/1 A, 1 R
See application file for complete search history.

(56) References Cited

U.S. PATENT DOCUMENTS

| | | | |
|---|---|---|---|
| 3,559,027 A | 1/1971 | Arsem | |
| 4,032,829 A | 6/1977 | Schenavar | |
| 4,500,827 A | 2/1985 | Merritt et al. | |
| 5,343,397 A | 8/1994 | Yoshino et al. | |
| 5,347,186 A | 9/1994 | Konotchick | |
| 5,477,748 A | 12/1995 | Kimura | |
| 5,578,877 A | 11/1996 | Tiemann | |
| 5,590,734 A | 1/1997 | Caires | |
| 5,696,413 A | 12/1997 | Woodbridge et al. | |
| 5,808,433 A | 9/1998 | Tagami et al. | |
| 6,020,653 A | 2/2000 | Woodbridge et al. | |
| 6,064,167 A | 5/2000 | Takenaka et al. | |
| 6,266,576 B1 | 7/2001 | Okada et al. | |
| 6,962,220 B2 | 11/2005 | Takenaka et al. | |
| 6,982,497 B2 | 1/2006 | Rome | |
| 7,190,141 B1 | 3/2007 | Ashrafiuon et al. | |
| 7,245,041 B1 | 7/2007 | Olson | |
| 7,345,407 B2 | 3/2008 | Tanner | |
| 7,352,073 B2 | 4/2008 | Ames | |
| 7,391,123 B2 | 6/2008 | Rome | |
| 7,405,489 B2 | 7/2008 | Leijon et al. | |
| 7,420,287 B2 | 9/2008 | Smushkovich | |
| 7,540,342 B1 | 6/2009 | Ein | |
| 2001/0035723 A1 | 11/2001 | Pelrine et al. | |
| 2004/0130227 A1 | 7/2004 | Ricker | |

(Continued)

OTHER PUBLICATIONS

Arthur D. Kuo, Harvesting Energy by Improving the Economy of Human Walking, www.sciencemag.org, Sep. 9, 2005, vol. 309, p. 1686-1687.

(Continued)

*Primary Examiner* — Kevin Hurley
(74) *Attorney, Agent, or Firm* — Gifford, Krass, Sprinkle, Anderson & Citkowski, P.C.

(57) ABSTRACT

An energy efficient biped robotic system with passive-dynamic locomotion includes a body having a frame, an energy recapture mechanism, and a leg. The cyclical movement of the leg during passive-dynamic locomotion is transferred to a load through a mechanical energy storage mechanism, and the resulting oscillatory movement of the load is transferred by the mechanical energy input mechanism to an electric energy generating mechanism. The generated electric energy is transferred to the energy storage device for use by the robotic system.

24 Claims, 2 Drawing Sheets

U.S. PATENT DOCUMENTS

2005/0113973 A1    5/2005    Endo et al.
2005/0194194 A1    9/2005    Delson
2006/0241809 A1    10/2006    Goswami et al.

OTHER PUBLICATIONS

M. Wisse, A.L. Schwab, R.Q. vd. Linde, A 3D Passive Dynamic Biped With Yaw and Roll Compensation, Robotica (2001), vol. 19, pp. 275-284.

L.C. Rome, L. Flynn, E.M. Goldman, T.D. Yoo, Generating Electricity While Walking with Loads, www.sciencemag.org, vol. 309, Sep. 9, 2005, p. 1725-1728.

S. Collins, A. Ruina, R. Tedrake, M. Wisse, Efficient Bipedal Robots Based on Passive-Dynamic Walkers, Feb. 18, 2005, Science Magazine, vol. 307, pp. 1082-1085.

S. Collins, M. Wisse, A. Ruina, "A Three-Dimensional Passive-Dynamic Walking Robot with Two Legs and Knees," The International Journal of Robotics Research, vol. 20, No. 7, Jul. 2001, pp. 607-615.

ENERGY EFFICIENT ROBOTIC SYSTEM

REFERENCE TO RELATED APPLICATIONS

This application is a divisional of U.S. patent application Ser. No. 11/753,715, filed Mar. 25, 2007, the entire content of which is incorporated herein by reference.

BACKGROUND OF THE INVENTION

1. Field of the Invention

The present invention relates generally to an energy efficient robotic system, and more specifically, to an energy efficient robotic system with passive-dynamic locomotion.

2. Description of the Related Art

Various types of robotic systems are known that mimic human functions, such as locomotion, talking, manipulating an object or the like. Human walking is a complex function involving the coordinated activity of the foot, ankle, leg and hip, as well as the arms and brain. One example of a robotic system that has the ability to walk and a human-like form is a bipedal robot. The bipedal robot requires precise actuators and sophisticated control strategies, in order to mimic human walking by actively controlling every joint angle in the leg and foot, so that the center of mass of the robot remains as level as possible. However, this type of controlled gait is much less efficient than an actual human walking gait. As a result, the bipedal robot requires greater energy expenditure, as compared to that of a walking comparably sized human.

More recently, it has been demonstrated that walking with a less smooth gait, where the center of mass rises and falls in an oscillatory manner with each step, provides a significant increase in movement efficiency, thereby reducing the energy output level to one more comparable with human walking. An example of a robotic system with an oscillatory gait is a passive-dynamic walker. The passive-dynamic walker is a simple machine that models the leg portion of the robot as a passive mechanical structure, and utilizes the dynamic motion of the robot's swinging limbs to propel the machine. The early passive-dynamic walkers relied on the force of gravity to walk down an inclined surface. More recently, passive-dynamic walkers have been developed which utilize at least one active power source that enables the machine to walk on level ground. The gait of the passive-dynamic walker is remarkably humanlike, and resembles an up/down motion of the center of mass as the foot strikes the surface and then pushes upward off the surface. Since the passive-dynamic walker does not rely primarily on constantly energized controllers and actuators to control joint angles, it uses less energy than a comparable bipedal robot.

The control capabilities of robotic systems have increased in recent years. However, the energy storage capability of most robotic systems remains a fundamental limitation. Although the previously described passive-dynamic walker requires less energy than a dynamic robotic system, the passive-dynamic walker robotic system is still limited by the power requirements. Thus, there is the need in the art for a passive-dynamic robotic system that incorporates a renewable energy source in order to increase the efficiency of the energy usage of the robotic system.

SUMMARY OF THE INVENTION

Accordingly, the present invention is an energy efficient biped robotic system with passive-dynamic locomotion. The system includes a body portion having a frame. An energy recapture mechanism is suspended within the frame. The energy recapture mechanism includes a load, a mechanical energy storage mechanism interconnecting the load and the frame, and a guide means secured to the load for guiding movement of the load with respect to the frame. A mechanical energy input mechanism interconnects the load with an electric energy generating mechanism for generating electric energy from a mechanical motion of the load. An output means transfers the generated electric energy to an energy storage device. The robot also includes a leg connected to the body portion. The cyclical movement of the leg during passive-dynamic locomotion is transferred to the load through the mechanical energy storage mechanism, and an oscillatory movement of the load resulting from the cyclical movement of the leg is transferred by the mechanical energy input mechanism as a mechanical energy input to the electric energy generating mechanism to generate electric energy. The generated electric energy is transferred to the energy storage device for use by the robotic system.

One advantage of the present invention is that an energy-efficient bipedal robotic system is provided that relies on passive-dynamic locomotion. Another advantage of the present invention is a robotic system is provided that includes a portable, renewable energy source. Still another advantage of the present invention is that a robotic system is provided that includes a rechargeable battery that utilizes the cyclical motion of the robot during locomotion to recharge the battery. A further advantage of the present invention is that the passive-dynamic bipedal robot is energy efficient since it recaptures energy that would otherwise be lost. Still a further advantage of the present invention is that the passive-dynamic bipedal robot combines both a spring-based mechanical energy storage device with a generator-based electric energy regeneration device.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
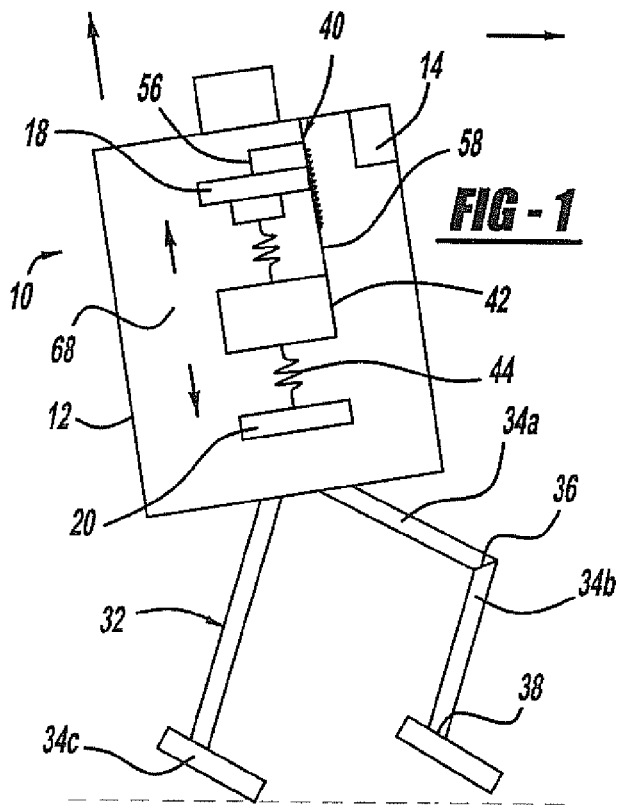
FIG. 1 is a side view of an energy efficient robotic system, according to the present inventions.
Figure 2:
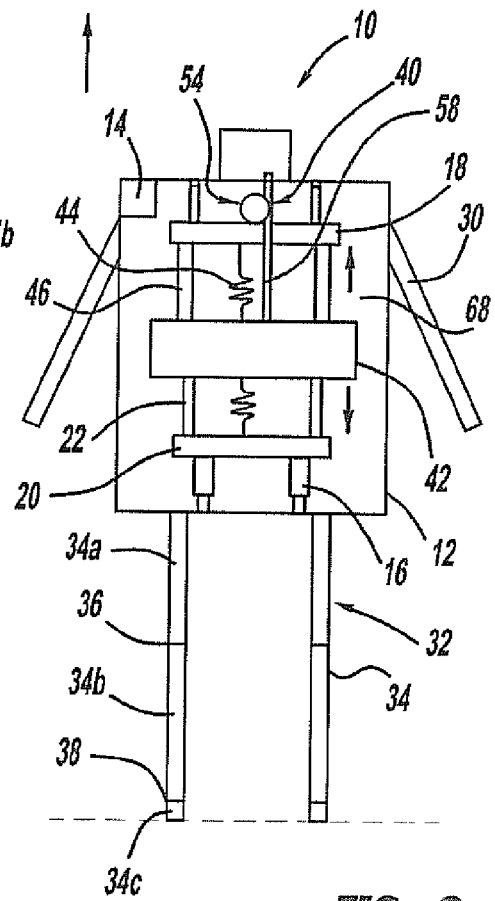
FIG. 2 is a front view of the energy efficient robotic system of FIG. 1, according to the present inventions.

Referring to FIGS. 1-5, an energy efficient robotic system is illustrated. In this example, the robotic system is a powered, biped mobile robot 10, and in particular a passive-dynamic walking robot. The passive-dynamic walking robot 10 experiences vertically oriented cyclical or oscillatory variation during locomotion along a surface.

The robotic system 10 includes a body portion 12. The body portion 12 provides a housing. In this example, the body portion 12 has a box-like shape; however, the shape is non-limiting. The body houses a control mechanism 14 for controlling the functionality of the robot. For example, the control mechanism is a controller which includes a processor, a memory and input/output devices. The body portion 12 also houses an energy recapture mechanism, to be described, which provides a predetermined level of operational power for the robot. The body portion 12 includes a frame support structure 16. For example, the frame support structure may include an upper frame member 18, a lower frame member 20, and side frame members 22 interconnecting the upper frame member 18 and lower frame member 20. In another example, the frame support structure 16 may also include cross members 24 interconnecting a front frame section 26 with a rear frame section 28, and each of the front frame section and rear frame section includes an upper frame member 18, lower frame member 20 and side frame members 22. It should be appreciated that other structural examples are contemplated.

The robotic system 10 also includes an arm 30. An upper end of the arm is operatively connected to the body portion 12. The arm 30 may include individual bar members that are interconnected via joints or actuators. The lower end of the arm 30 may be operatively connected to a hand (not shown). The hand may include a plurality of interconnected hand members that operatively perform a particular operation.

The robotic system 10 also includes a leg 32, and preferably two legs, extending downwardly from the body portion. It should be appreciated that the legs 32 support the body portion 12 while standing, and facilitate locomotion of the robotic system 10. Each leg 32 includes a plurality of leg members 34 interconnected by a knee joint 36. The upper end of a first leg member 34a is operatively attached to the body portion 12, similar to the hip joint in a human. The lower end of a second leg member 34b is operatively connected to a foot portion 34c via an ankle joint 38 that is similar to the ankle joint in a human. The foot portion 34c is in contact with a surface during locomotion.

The locomotion of the robotic system 10 can take on various forms. One example is passive-dynamic walking, whereby the leg 32 is kept straight and the arms 30 swing in counter-opposition to the leas 32. The passive-dynamic robot utilizes a simple power source, such as gravitational power or other type of minimal actuation, in order to keep any additional energy input to a minimum. For example, only the ankle joint 38 utilizes an actuator, in order to minimize energy usage. As the robotic system 10 moves, each foot 34c is lifted alternately off the ground surface, in a side-to-side motion. The foot placement is utilized to minimize the side-to-side impact and to assist in balance of the robotic system 10. The resulting motion of the robotic system 10 is oscillatory, with a substantially vertical component. It should be appreciated that a controller may control the step-by-step movement of the robot's feet 34c through sensors that detect contact with the surface during locomotion. In addition, the controller may utilize the concept of learning, in order for the robotic system 10 to adapt to various surfaces during locomotion.

The energy recapture mechanism 40 is a device that uses the oscillatory movement of the robotic system 10 during locomotion and converts it to electric energy to contribute to operating the robotic system 10. The energy recapture mechanism 40 is suspended from the frame support structure 16 within the body portion 12, in order to maximize displacement during locomotion, and thus energy recapture. The energy recapture mechanism 40 may be positioned close to the center of mass of the robotic system 10, so as to provide additional stability to the mechanically oscillating energy recapture mechanism 40.

Figure 3:
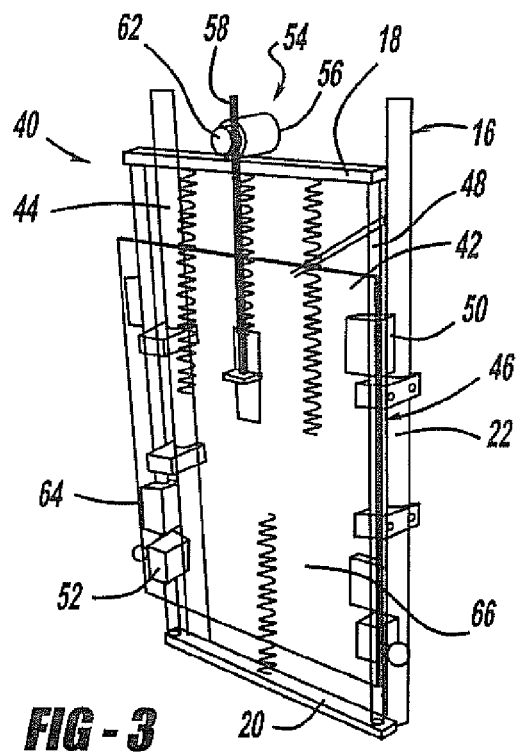
FIG. 3 is a perspective view of the energy recapture mechanism for the energy efficient robotic system model of FIG. 1, according to the present inventions.
Figure 4:
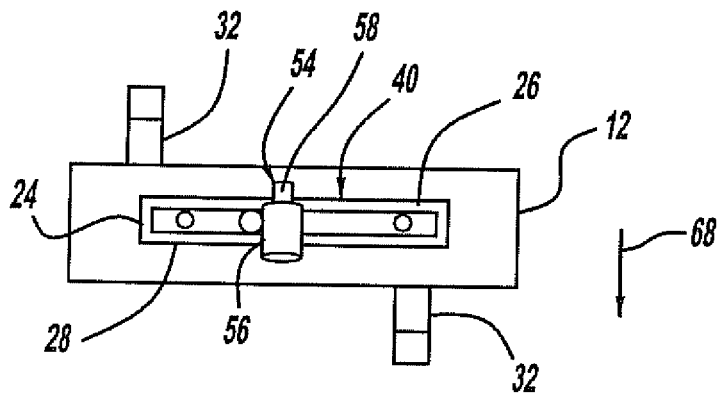
FIG. 4 is a top view of the energy recapture mechanism system of FIG. 1, according to the present inventions.
Figure 5:
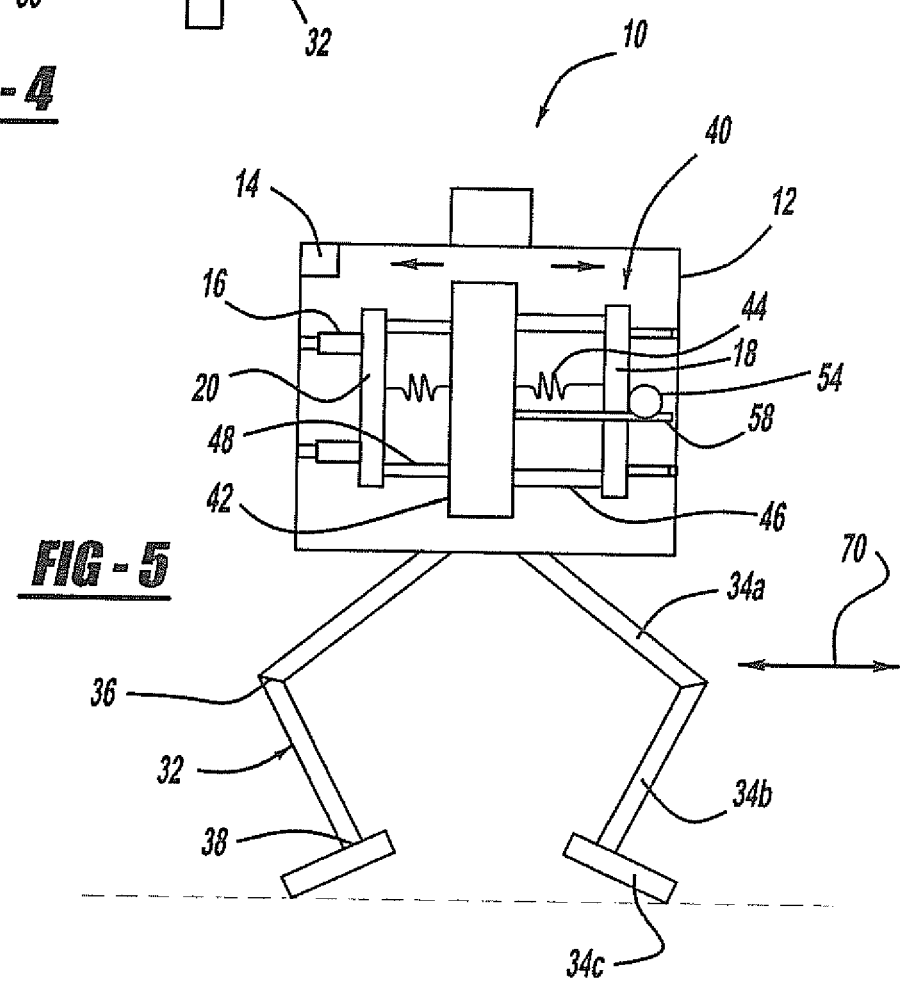
FIG. 5 is a front view of another example of the energy efficient robotic system, according to the present inventions.

The energy recapture mechanism 40 includes a load 42 or mass. In this example, the load 42 is an energy storage device such as a battery. Another example of an energy storage device is a fuel cell, a capacitor, a flywheel, or another type of power source. As shown in FIG. 3, the load may be integral with a plate.

The energy recapture mechanism 40 also includes at least one mechanical energy storage mechanism 44, such as a spring or the like. Various types of springs are suitable, and the spring can be positioned in various locations. For example, the spring 44 has one end attached to the load 42, and a second end attached to the frame support structure 16. In another example, there is an upper spring, and a lower spring. The upper spring 44 has one end attached to the load 42, and a second end attached to an upper frame member 18. Similarly, the lower spring 44 has one end attached to the load 42, and a second end attached to a lower frame member 20. Other examples of springs or spring positions are available.

The energy recapture mechanism 40 also includes a guide means 46 for smoothly directing and stabilizing the movement of the load 42. The guide means 46 preferably minimizes friction resulting from the movement of the load. In an example, the guide means 46 is a vertically oriented rod 48 extending between the upper frame member 18 and the lower frame member 20. A bushing 50 interconnects the load 42 with the vertical rod 48, and facilitates the vertical movement of the load 42 along the length of the vertical rod 48. The energy recapture mechanism 40 may include a linear transducer 52 for measuring the vertical movement of the load 42 along the vertical rod 48 as a result of movement of the robotic system. Another example of a guide means is a rod 48 as previously described, and a wheel slidably coupled to the rod. Other examples of slidable connections are contemplated within the scope of this invention.

The energy recapture mechanism 40 includes an electric energy generating means 54, such as a generator, geared dc motor, or the like. In this example, a generator 56 is fixedly mounted to the upper frame member 18. A toothed beam 58 interconnects the load with a pinion gear 62 on the generator 56. The movement of the toothed beam 58 that results from the oscillatory movement of the load 42, turns the pinion gear 62 mounted on the generator housing, in order to transform the mechanical energy into electricity. It should be appreciated that other mechanisms, such as a belt, magnets oscillated through coils, or the like, could be used to couple the oscillating mass to a power transformation system to reclaim the mechanical energy for storage and later re-use. Further, these mechanisms can be used to maximize the energy harvesting efficiency of the energy recapture mechanism 40 and tune the mechanical reactance of the mass's oscillation to match the needs of a particular robotic motion. In addition, the locomotion, such as walking gait, of the robot may be additionally optimized to maximize the mechanical, electrical, or combined efficiency of the system. The efficiency allows the system to advantageously take into account both the power required for robotic system locomotion and the power transferred to the load and therefore recovered for re-use.

The energy recapture mechanism 40 may also include a damping element 64, such as a shock absorber or another type of adaptive mechanically reactive mechanism. The damping element 64 includes various properties or qualities. These properties or qualities may be static or dynamic. Further, these properties or qualities may be selected or adjusted or tuned to accommodate the environment of the energy efficient robotic system 10, the activity level, a system state, or the like. For example, the type of damping system is selected to adapt oscillations of the load to the intended use of the energy efficient robotic system 10. An example of a quality is the Q-factor of the load oscillation. In another example, the resonance of the load oscillation may be mechanically adjusted to approximate the frequency of motion induced by locomotion, such as walking or running or the like. In still another example, a user may adaptively modify the energy recapture mechanism in real time to accommodate variations in the load, gait or gait cycle or the like, for example, due to changes in speed or surface. In a further example, a user may tune the damping element 64 in real time, to further accommodate variations in the load. In still a further example, a predetermined property or quality may be adaptively updated in response to changes. A learning process may be used, whereby a response to a predetermined event is learned and saved for use in similar circumstances.

It should be appreciated that the electric output of the generator 56 can be used for other purposes, such as recharging a battery, or providing additional electric power to the robotic system 10 or for another purpose.

In operation, as the robot walks, the step of the robot induces some vertical oscillatory motion at the robot's center of mass. This results in the transfer of the oscillatory movement and the transfer of the oscillatory forces on the center of mass, to the load 42. The spring loading of the load generates a periodic upward movement, that when tuned to the frequency of the robotic system steps, will facilitate the unweighting of the robot's other leg, to permit increased walking efficiency, similar to that of human locomotion in a similar condition. This occurs through mechanical energy stored in the spring instead of requiring the expenditure of electrical energy from the electric energy generating means or an electrical energy storage device. It should be appreciated that the vertical oscillatory movement can be amplified by spring 44 characteristic selection.

The resulting linear movement of the beam 58 drives the pinion gear 62, in order to drive the generator 56. The generator 56 produces electric energy, which may be returned to the battery of this example or transferred to another electric energy storage device, for later use by the system, or for another use by the robotic system 10. It should be appreciated that electric power generation is dependent on the weight of the load 42 and the vertical displacement of the load 42. Further, the overall efficiency of the robot's energy utilization and duration of the useful charge may be increased through energy storage.

In this example, the center of mass of the robot is oscillatory in a substantially vertical plane, as shown at 68. Typically, power is not supplied through every phase of the walking cycle. It is contemplated that the battery may be positioned inside the body portion 12, or otherwise connected to the frame support structure 16. Further, the oscillating object may be another suitable mass, such as the limb of the robot or another lever aim or the like.

It should be appreciated that the oscillatory motion may be another type of oscillatory or rotary motion that is non-vertical. For example, the energy recapture mechanism captures rotational motion, and the oscillatory motion drives the generator rotationally. In another example shown in FIG. 5, the locomotion is a side-to-side or bidirectional, oscillatory gait, as shown at 70. This type of gait induces a side-to-side or substantially horizontal oscillation of the battery along a horizontal plane. As shown in this example, the energy recapture mechanism can also have a substantially horizontal orientation. Any of these motions can be similarly coupled to the generator, in order to increase the energy efficiency of the robotic system 10.

The robotic system 10 may include other components or features necessary to carry out its functions. For example, the springs may be tuned adaptively to maximize the oscillations for different motions, thus improving the energy gain. Similarly, the robotic system could include a plurality of smaller energy recapture systems positioned in various locations on the robot where oscillations occur for an extended period or motion. For example, if the limbs of the robot performed an oscillatory wiping function, an energy regeneration system acting at a joint and tuned to take advantage of the wiping frequency, could potentially reduce the energy used to perform the wiping task. Other energy reductions can further be accomplished by optimizing the use of mechanical springs to amplify small energy inputs to move a large wiping arm, and by reclaiming energy and storing it for later use. In another example, the robot may include wheels, and the motion is similarly recaptured. In still another example, rotational movement may be obtained using an energy recapture mechanism that operates rotationally to transform the mechanical energy into electricity.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An apparatus, the apparatus being a robotic system with passive dynamic locomotion, the apparatus comprising:
   a body portion, the body portion being a robot body portion;
   a leg connected to the body portion, the leg having a cyclical movement during passive dynamic locomotion of the robotic system,
   the cyclical movement of the leg inducing a movement of the body portion; and
   an energy recapture mechanism, located within the body portion, operable to use the movement of the body portion during locomotion to generate electric energy used for operation of the robotic system,
   the energy recapture mechanism including a load suspended for movement within the body portion and an electric energy generating mechanism for generating electric energy from a motion of the load,
   the motion of the load being induced by the movement of the body portion.

2. The apparatus of claim 1, the apparatus further comprising an energy storage device located within the body portion,
   the energy storage device receiving electrical energy from the electric energy generating mechanism.

3. The apparatus of claim 2, the load including the energy storage device.

4. The apparatus of claim 3, the energy storage device being a rechargeable battery, the electrical energy from the electric energy generating mechanism being used to recharge the rechargeable battery.

5. The apparatus of claim 1, the cyclical movement of the leg inducing an oscillatory movement of the body portion.

6. An apparatus, the apparatus being a robotic system with passive dynamic locomotion, the apparatus comprising:
   a body portion, the body portion being a robot body portion;
   a leg connected to the body portion, the leg having a cyclical movement during passive dynamic locomotion of the robotic system;
   an energy recapture mechanism located within the body portion, the energy recapture mechanism including
   a load, the load being suspended for movement within the body portion, and an electric energy generating mechanism for generating electric energy from a motion of the load, the motion of the load being induced by the cyclical movement of the leg during passive dynamic locomotion of the robotic system; and an energy storage device located within the body portion, receiving electrical energy from the electric energy generating mechanism.

7. The apparatus of claim 6, the load including the energy storage device.

8. The apparatus of claim 6, the energy storage device being a rechargeable battery, the electrical energy from the electric energy generating mechanism being used to recharge the rechargeable battery.

9. The apparatus of claim 6, the apparatus comprising two legs connected to the body portion.

10. The apparatus of claim 9, each leg including first and second leg members interconnected by a knee joint.

11. The apparatus of claim 9, wherein a cyclical movement of the legs during passive-dynamic locomotion provides a mechanical energy input to the electric energy generating mechanism, so as to generate electric energy.

12. The apparatus of claim 9, wherein spring-loading of the load generates a periodic upward motion during locomotion that alternately unweights each of the legs, so as to increase locomotion efficiency.

13. The apparatus of claim 6, the load being spring-loaded from the body portion using a spring.

14. The apparatus of claim 13, further including a damping element associated with the spring.

15. The apparatus of claim 14, wherein each of the spring and the damping element is adjustable to accommodate variations in the load.

16. The apparatus of claim 13, the load including the energy storage device.

17. The apparatus of claim 6, the body portion including a frame, the energy recapture mechanism being suspended from the frame, the motion of the load being with respect to the frame.

18. The apparatus of claim 17, wherein the frame includes a guide mechanism for guiding the motion of the load, the guide mechanism being secured to the frame.

19. The apparatus of claim 18, the guide mechanism including a rod, the motion of the load being guided by the rod.

20. The apparatus of claim 6, wherein the electric energy generating mechanism includes a generator.

21. The apparatus of claim 6, further comprising an arm operatively connected to the body portion.

22. The apparatus of claim 6, the cyclical movement of the leg inducing an oscillatory movement of the body portion.

23. The apparatus of claim 6, the motion of the load being an oscillatory motion with respect to the body portion, the oscillatory motion of the load resulting from the cyclical movement of the leg.

24. The apparatus of claim 6, the motion of the load providing a mechanical energy input to the electric energy generating mechanism.

* * * * *